United States Patent [19]

Kinoshita

[11] Patent Number: 4,521,721
[45] Date of Patent: Jun. 4, 1985

[54] NUMERICAL CONTROL METHOD

[75] Inventor: Mitsuo Kinoshita, Hachioji, Japan

[73] Assignee: Fanuc Ltd., Minamitsuru, Japan

[21] Appl. No.: 398,903

[22] Filed: Jul. 16, 1982

[30] Foreign Application Priority Data

Jul. 31, 1981 [JP] Japan ................................ 56-120347

[51] Int. Cl.$^3$ ............................................. G05B 19/24
[52] U.S. Cl. ................................... 318/573; 318/569;
318/600; 364/169
[58] Field of Search ............... 318/573, 569, 570, 600;
364/168, 169, 167

[56] References Cited

U.S. PATENT DOCUMENTS

| | | |
|---|---|---|
| 3,578,959 | 5/1971 | Perkins et al. |
| 4,156,835 | 5/1979 | Whitney et al. |
| 4,243,924 | 1/1981 | Onada et al. ......................... 318/573 |
| 4,404,507 | 9/1983 | Dean et al. ........................... 318/573 |

Primary Examiner—B. Dobeck
Attorney, Agent, or Firm—Staas & Halsey

[57] ABSTRACT

Disclosed is a numerical control method for positionally controlling a movable element of a machine tool in such a manner that numerically controlled machining is performed along a projected path obtained by projecting a programmed path, lying on a predetermined plane, onto a plane of projection inclined at a predetermined angle with respect to the first-mentioned plane. The method includes the steps of entering data specifying a programmed path on the predetermined plane, subjecting the entered data to a projective transformation in accordance with entered projection angle data to generate projective transformation data specifying the projected path, and performing an interpolation on the basis of the projective transformation data to produce an output signal indicative of the results of the interpolation, and positionally controlling the movable element on the basis of the projective transformation output signal.

15 Claims, 7 Drawing Figures

NUMERICAL CONTROL METHOD

BACKGROUND OF THE INVENTION

This invention relates to a numerical control method and, more particularly, to a numerical control method for executing numerically controlled machining along a projected path obtained by projecting a programmed path, lying on a predetermined plane, onto a plane of projection inclined at a predetermined angle with respect to the first-mentioned plane.

In machine tools, especially wire-cut electric discharge machines, there are cases where cutting is performed along a path obtained by projecting a programmed path lying on a predetermined plane, such as the X-Y plane, on a plane of projection which is inclined at a predetermined angle (projection angle) with respect to the X-Y plane. The path obtained is referred to as a projected path. In some instances a path such as a circular arc on the X-Y plane will not be a circular arc when projected on the plane of projection. It has therefore been conventional practice to create numerical control (NC) data specifying the projected path and then execute numerical control processing on the basis of this data in order to perform cutting along the projected path. The conventional method is disadvantageous, however, in that creating the NC data specifying the projected path requires considerable programming time and is a troublesome task.

SUMMARY OF THE INVENTION

Accordingly, an object of the present invention is to provide a numerical control method which enables cutting to be performed along a projected path without requiring the creation of numerical control data specifying the projected path.

Another object of the present invention is to provide a numerical control method which enables cutting to be performed along a projected path by effecting a projective transformation using data that specifies a programmed path lying on a predetermined plane.

Still another object of the present invention is to provide a numerical control method which enables input data programming steps to be simplified when cutting is to be performed along a projected path.

A further object of the present invention is to provide a numerical control method which enables input data programming time to be shortened when cutting is to be performed along a projected path.

Disclosed is a numerical control method for positionally controlling a movable element of a machine tool in such a manner that numerically controlled machining is performed along a projected path obtained by projecting a programmed path, lying on a predetermined plane, onto a plane of projection inclined at a predetermined angle with respect to the first-mentioned plane. The method includes the steps of entering data specifying a programmed path on the predetermined plane, subjecting the entered data to a projective transformation in accordance with entered projection angle data to generate projective transformation data specifying the projected path, performing an interpolation on the basis of the projective transformation data to produce an output signal indicative of the results of the interpolation, and positionally controlling the movable element on the basis of the projective transformation output signal.

Other features and advantages of the invention will be apparent from the following description taken in conjunction with the accompanying drawings in which like reference characters designate the same or similar parts throughout the figures thereof.

DESCRIPTION OF THE PREFERRED EMBODIMENT

Figure 1:
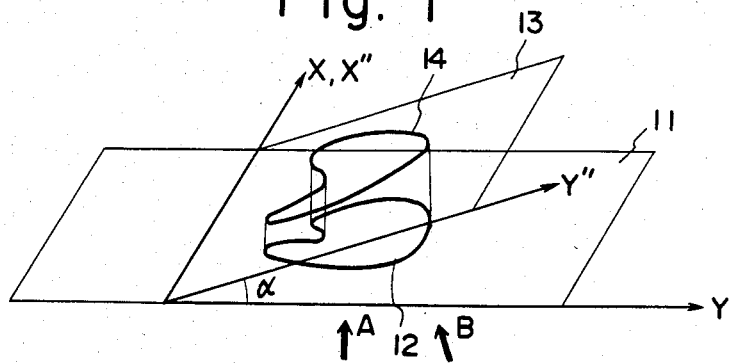
FIG. 1 is an illustrative view useful in describing a plane of projection and a projected path which are factors in the present invention.

Referring to FIG. 1, numeral 11 denotes the X-Y plane, 12 a programmed path specified on the X-Y plane, and 13 a plane of projection X''-Y'' which is rotated about the X axis to incline the plane at a projection angle $\alpha$ with respect to the X-Y plane. A projected path 14 is obtained on the plane 13 by projecting the programmed path 12 onto the plane along the direction of arrow A, orthogonal to plane 11. When the programmed path 12 is thus projected on the X''-Y'' plane along the direction orthogonal to the X-Y plane, the resulting projected path 14 is elongated along the Y'' axis. For instance, if the programmed path on the X-Y plane is a circle, then the projected path on the X''-Y'' plane will be an ellipse whose major axis extends parallel to the Y'' axis. Conversely, when the programmed path 12 is projected on the plane of projection 13 in the direction orthogonal thereto (in the direction B), the projected path 14 contracts along the Y'' axis. Now the circular programmed path on the X-Y plane will result in a projected path that is shortened along the Y'' axis, defining an ellipse whose major axis lies parallel to the X'' axis.

The above is for a case where the X-Y plane is rotated about the X axis. It is obvious that the results will be the same if a plane of projection is formed by rotating the X-Y plane about the Y-axis.

Figure 2:
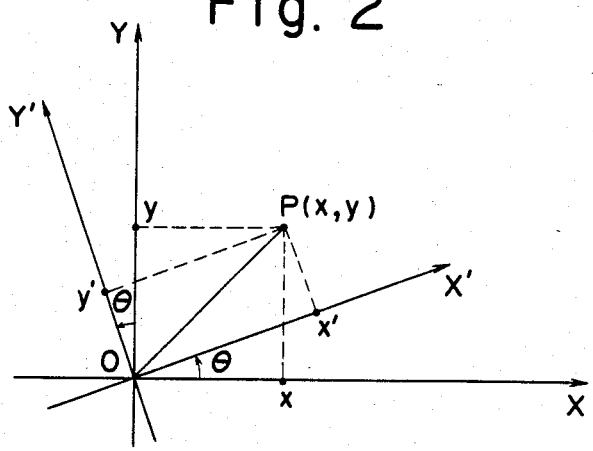
FIG. 2 is an illustrative view useful in describing a case where X-Y coordinates are rotated through an angle $\theta$ to establish an X'-Y' coordinate system in accordance with the method of the present invention.

Reference will now be had to FIG. 2 to describe a case where X-Y coordinates are rotated through an angle $\theta$ to establish an X'-Y' coordinate system. To create the plane of projection X''-Y'' depicted in FIG. 1, the usual practice is to rotate the X-Y coordinates through an angle $\theta$ (referred to as the projective direction angle) to obtain the X'-Y' plane, as shown in FIG. 2, and then rotate the X'-Y' plane about its X' axis (or Y' axis) through a projection angle $\alpha$. The result is the plane of projection X''-Y''. If we determine the transformation formula between the plane of projection (the X''-Y'' plane) and the X-Y plane, then use of the formula will allow us to transform the programmed path on the X-Y plane into the projected path of the plane X''-Y'', eliminating the need to create the NC data specifying the projected path.

If we let X'-Y' denote the plane arrived at by rotating the X-Y plane about its origin O through the projective direction angle $\theta$, then the coordinates (x', y') of a point P on the X'-Y' plane can be found from the following formula, using the coordinates (x, y) of the point on the X-Y plane:

$$\begin{pmatrix} x' \\ y' \end{pmatrix} = \begin{pmatrix} \cos\theta & \sin\theta \\ -\sin\theta & \cos\theta \end{pmatrix} \begin{pmatrix} x \\ y \end{pmatrix} \qquad (1)$$

Figure 3:
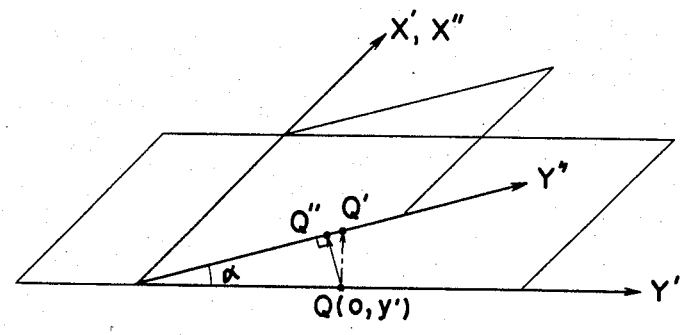
FIG. 3 is an illustrative view useful in describing a transformation formula for effecting a transformation from the x'-Y' plane to an X''-Y'' plane (plane of projection) in accordance with the method of the present invention.

FIG. 3 is useful in describing the formula for effecting the transformation from the X'-Y' plane to the X''-Y'' plane (plane of projection). The X''-Y'' plane is obtained by rotating the X'-Y' plane about its X' axis through the projection angle $\alpha$. We shall let Q' denote a point which is obtained on the X''-Y'' plane by the projection of a point Q, located on the X'-Y' plane, along a straight line orthogonal to the X'-Y' plane. The coordinates (x'', y'') of the point Q' will be given by $$x'' = x', \quad y'' = y'/\cos\alpha \qquad (2)$$

whereby the transformation formula between the X'-Y' plane and the X''-Y'' plane will be written:

$$\begin{pmatrix} x'' \\ y'' \end{pmatrix} = \begin{pmatrix} 1 & 0 \\ 0 & k \end{pmatrix} \begin{pmatrix} x' \\ y' \end{pmatrix} \qquad (3)$$

where $k = 1/\cos\alpha$. Further, we shall let Q'' denote a point which is obtained on the X''-Y'' plane by the projection of the point Q along a straight line orthogonal to the X''-Y'' plane. The coordinates (x'', y'') of the point Q'' will then be given by $$x'' = x', \quad y'' = y'\cos\alpha \qquad (4)$$

whereby the transformation formula between the X'-Y' plane and the X''-Y'' plane can expressed as formula (3) under the condition $k = \cos\alpha$. Accordingly, the transformation formula between the X'-Y' and X''-Y'' planes can be expressed by formula (3) if k is selected to be $\cos\alpha$ or $1/\cos\alpha$ in accordance with the direction of projection. We may thus find the transformation formula between the X''-Y'' plane and the X-Y plane by substituting formula (1) into formula (3):

$$\begin{pmatrix} x'' \\ y'' \end{pmatrix} = \begin{pmatrix} 1 & 0 \\ 0 & k \end{pmatrix} \begin{pmatrix} \cos\theta & \sin\theta \\ -\sin\theta & \cos\theta \end{pmatrix} \begin{pmatrix} x \\ y \end{pmatrix} \qquad (5)$$

$$= \begin{pmatrix} \cos\theta & \sin\theta \\ -k\sin\theta & k\cos\theta \end{pmatrix} \begin{pmatrix} x \\ y \end{pmatrix}$$

The above formula 5 is the sought transformation formula. Viewing the coordinate values x'', y'' from the X-Y coordinate system or, more specifically, effecting a conversion into graphic data as seen from the X-Y coordinate system gives us:

$$\begin{pmatrix} x'' \\ y'' \end{pmatrix} = \begin{pmatrix} \cos\theta & -\sin\theta \\ \sin\theta & \cos\theta \end{pmatrix} \begin{pmatrix} \cos\theta & \sin\theta \\ -k\sin\theta & k\cos\theta \end{pmatrix} \begin{pmatrix} x \\ y \end{pmatrix} \qquad (6)$$

It should be noted that formula (6) may be obtained through a coordinate transformation achieved by rotating the X''-Y'' plane through the angle $-\theta$. Expanding formula (6) gives us:

$$x'' = (\cos^2\theta + k\sin^2\theta)x + \sin\theta\cos\theta(1-k)y \qquad (7)$$

$$y'' = \sin\theta\cos\theta(1-k)x + (\sin^2\theta + k\cos^2\theta)y \qquad (8)$$

Figure 4:
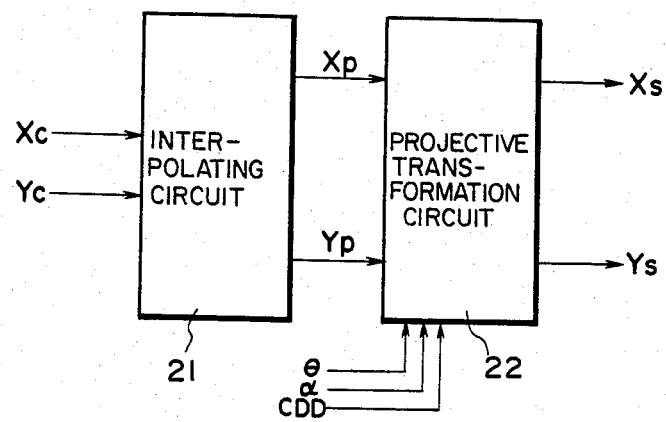
FIGS. 4 and 5 are block diagram of an apparatus for practicing the method of the present invention.
Figure 5:
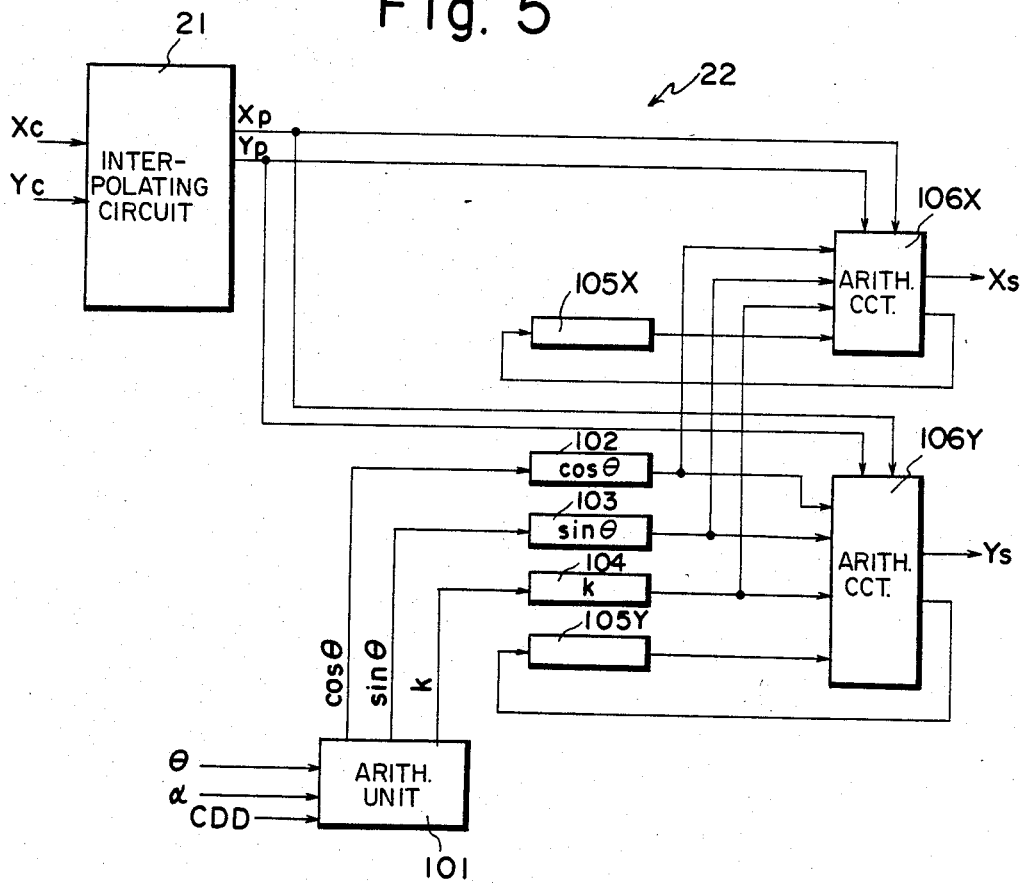

Reference will now be had to FIGS. 4 and 5 to describe a numerical control method according to the present invention. FIG. 4 is a simplified block diagram of an apparatus for practicing the method of the invention, and FIG. 5 a more detailed view of the apparatus.

In FIG. 4, numeral 21 denotes an interpolating circuit and 22 a projective transformation circuit. NC data specifying a programmed path on the X-Y plane is stored beforehand on a paper tape or any other NC program storage medium (not shown) and is read in from the medium in a block-by-block fashion. If a block of NC data read in from the paper tape or the like is positioning or cutting path data, the data, denoted Xc and Yc, is fed into the interpolating circuit 21. The interpolating circuit 21, upon receiving positioning data, performs a pulse distribution computation on the basis of the data, producing distributed pulses Xp and Yp (for the X and Y axes, respectively) that are applied to the projective transformation circuit 22. The latter circuit executes a projective transformation, described below, on the basis of the distributed pulses, producing pulse trains Xs and Ys obtained as a result of the transformation. These pulse trains are applied to machine tool servo circuitry (not shown) to control the movement of a movable element such a tool or table.

FIG. 5 shows the projective conversion circuit 22 in detail. The circuit includes an arithmetic unit 101 for computing $\sin\theta$, $\cos\theta$ and k (=$\cos\alpha$ or $1/\cos\alpha$) upon the received signals indicative of the projective direction angle $\theta$, projection angle $\alpha$ and projective direction data CDD, registers 102, 103 and 104 for storing $\cos\theta$, $\sin\theta$ and k, respectively, registers 105X and 105Y for storing the results of computations, and arithmetic circuits 106X and 106Y for executing predetermined computations when the distributed pulses Xp or Yp are generated.

Letting the content of register 105X be R1, arithmetic circuit 106X performs the following operation each time a distributed pulse Xp is generated:

$$R1 + (\cos^2\theta + k\sin^2\theta) \rightarrow R1$$

and produces overflow pulses in the form of projective transformation pulses Xs along the X'' axis. The computed results left after the elimination of overflow are newly registered in register 105X as R1. Arithmetic circuit 106X also performs the following operation each time a distributed pulse Yp is generated:

$$R1 + \sin\theta\cos\theta(1-k) \rightarrow R1$$

and produces overflow pulses in the form of projective transformation pulses Xs along the X'' axis. The computed results left after the elimination of overflow are newly registered in register 105X as R1. In other words, arithmetic circuit 106X performs the projective transformation operation indicated by formula (7) and produces x''-number of projective transformation pulses Xs when x-number of distributed pulses Xp and y-number of distributed pulses Yp are generated along the X and Y axes, respectively. It should be noted that x'' is an integral number which satisfies the following equation:

$$x'' \leq [(\cos^2 \theta + k \sin^2 \theta)x + \sin \theta - \cos \theta(1-k)y] < (x''+1).$$

Meanwhile, arithmetic circuit 106Y performs the following operation each time a distributed pulse Xp is generated:

$$S1 + \sin \theta \cos \theta(1-k) \rightarrow S1$$

and produces overflow pulses in the form of projective transformation pulses Ys along the Y'' axis. The computed results left after the elimination of overflow are newly registered in register 105Y as S1. Arithmetic circuit 106Y also performs the following operation each time a distributed pulse YP is generated:

$$S1 + (\sin^2 \theta + k \cos^2 \theta) \rightarrow S1$$

and produces overflow pulses in the form of projective transformation pulses Ys along the Y'' axis. The computed results left after the elimination of overflow are newly registered in register 105Y as S1. In other words, arithmetic circuit 106Y performs the projective transformation operation indicated by formula (8) and produces y''-number of projective transformation pulses Ys when x-number of distributed pulses Xp and y-number of distributed pulses Yp are generated along the X and Y axes, respectively. It should be noted that y'' is an integral number which satisfies the following equation:

$$y'' \leq [\sin \theta \cos \theta(1-k)x + (\sin^2 \theta + k \cos^2 \theta)y] < (y''+1).$$

The projective transformation pulse trains Xs and Ys obtained from the projective transformation operation executed by the arithmetic circuits 106X and 106Y in the above fashion are applied to machine tool servo circuitry (not shown) thereby controlling the movement of the movable element of the machine tool, such as a tool or table. As a result of such control, the movable element will travel along the projected path lying in the plane of projection. Although the projective transformation circuit 22 has been described and illustrated in the form of hardware, it is obvious that the same may be realized by means of a microcomputer or the like.

Figure 6:
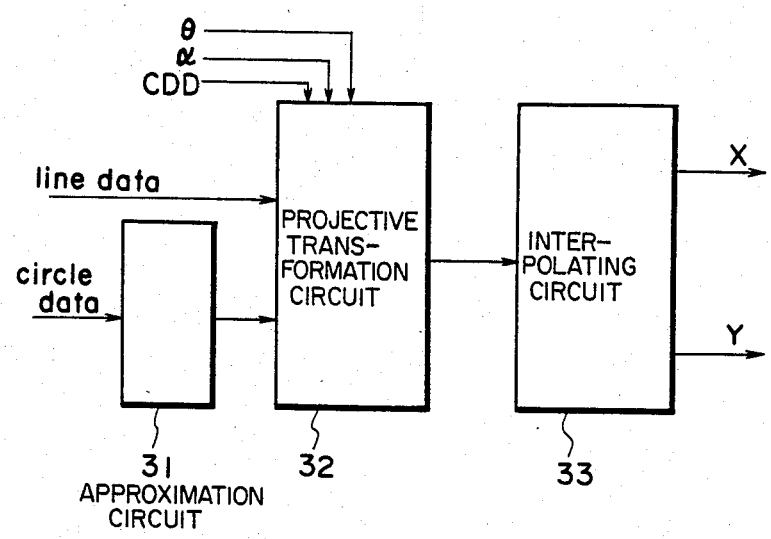
FIG. 6 is another example of an apparatus for practicing the method of the present invention.

FIG. 6 is a block diagram of apparatus for practicing another embodiment of the numerical control method of the present invention. Unlike the arrangement of FIGS. 4 and 5, (a) when the NC data specifying the programmed path on the X-Y plane is read in from the paper tape or the like, projective transformation processing is performed once on the basis of the formulae (7) and (8) and pulse distribution operations are executed on the basis of the data obtained from such processing, and (b) curves such as circular arcs are partitioned into a multiplicity of minute line segments, followed by projective transformation processing performed on the resulting line segments.

Figure 7:
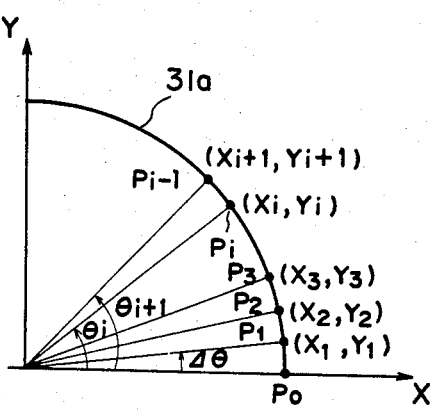
FIG. 7 is an illustrative view useful in describing a technique for partitioning a circular arc into straight line segments through the use of the apparatus shown in FIG. 6.

In FIG. 6, numeral 31 denotes an approximation circuit for approximating a curve or, in this example, a circular arc, by means of a multiplicity of minute line segments. The approximating circuit 31 is adapted to partition a circular arc 31a, shown in FIG. 7, in accordance with a minute central angle $\Delta\theta$, and to successively connect each of the partitioning points Pi (i=0,1,2 . . . ) to approximate the arc by means of the resulting straight line segments. The coordinates Xi and Yi of the partitioning points Pi may be found from the following equations:

$$Xi = R \cos \theta i, \quad Yi = R \sin \theta i$$

The output of the approximating circuit 31 is connected to a projective transformation circuit 32 which executes the projective transformation processing specified by the formulae (7) and (8) with regard to the starting and end points of each straight line segment on the X-Y plane for computing the coordinates on the plane of projection (the X''-Y'' plane). The output of the projective transformation circuit 32 is connected to an interpolating circuit 33 which executes pulse distribution operations on the basis of the transformation data obtained from circuit 32. NC data specifying a programmed path on the X-Y plane is stored beforehand on a paper tape or any other NC program storage medium (not shown) and is read in from said medium in a block-by-block fashion. If a block of NC data read in from the paper tape or the like is linear interpolation data Xc and Yc, the linear interpolation data is fed into the projective transformation circuit 32 where the coordinates specifying the end point of a line segment are transformed into coordinates on the plane of projection by using the formulae (7) and (8). Thenceforth incremental values on the plane of projection are computed, pulse trains Xs and Ys are generated as a result of a pulse distribution operation performed by the interpolating circuit 33 on the basis of the incremental values, and the pulse trains Xs and Ys are applied to the servo circuitry (not shown) to control the movement of the movable element such as the tool or table. If the NC data read in from the NC tape is circular interpolation data, on the other hand, then this data is applied to the approximation circuit 31 where the circular arc is partitioned into a multiplicity of minute line segments. Signals indicative of these line segments are applied to the projective transformation circuit 32, which then performs the transformation as described above.

In accordance with the present invention as described and illustrated hereinabove, programming is simplified and programming time shortened since it is no longer necessary to create the NC data specifying the path on the plane of projection. The invention also simplifies machining on the plane of projection, enhances the performance of NC devices and broadens their field of application.

Although a certain preferred embodiment has been shown and described in detail, it should be understood that many changes and modifications may be made therein without departing from the scope of the appended claims.

What we claim is:

1. A numerical control method for positionally controlling a movable element of a machine tool in such a manner that numerically controlled machining is performed along a projected path obtained by projecting a programmed path, lying on a predetermined plane, onto a plane of projection inclined at a predetermined angle with respect to the predetermined plane, said method comprising the steps of:
  (a) entering path data specifying a programmed path on the predetermined plane and angle data specifying the predetermined angle;
  (b) performing an interpolation on the basis of the entered path data to produce an output signal indicative of the results of the interpolation; and
  (c) subjecting the output signal obtained in step (b) to a projective transformation in accordance with the entered projection angle data to generate a projective transformation output signal specifying the projected path, and positionally controlling the movable element on the basis of the projective transformation output signal.

2. A numerical control method according to claim 1, wherein step (b) comprises performing a pulse distribution operation as said interpolation to produce distributed pulses as said output signal indicative of the results of said interpolation.

3. A numerical control method according to claim 2, wherein step (b) further comprises producing X-axis distributed pulses and Y-axis distributed pules, pertaining to X and Y axes on the predetermined plane, respectively, as said distributed pulses.

4. A numerical control method according to claim 2, wherein step (c) comprises subjecting said distributed pulses to a projective transformation as each pulse is received, in order to produce projective transformation pulses.

5. A numerical control method according to claim 4, wherein said projection angle data includes sinusoidal and cosinusoidal values, and wherein step (c) comprises the steps of:
  (a') performing an arithmetic operation of combining the sinusoidal and cosinusoidal values in said projection angle data each time a distributed pulse is received and adding the result of said arithmetic operation to the result of an arithmetic operation performed in response to receipt of the immediately preceding distributed pulse;
  (b') producing an output signal, indicative of overflow resulting from said addition, as said projective transformation pulses; and
  (c') storing the result of said addition, exclusive of said overflow, as the result of the current pulse distribution operation.

6. A numerical control method according to claim 5, wherein step (b) comprises producing X-axis distributed pulses and Y-axis distributed pulses, pertaining to X and Y axes on the predetermined plane, respectively, as said distributed pulses, and wherein step (c) further comprises adding said X-axis distributed pulses and said Y-axis distributed pulses as each is received.

7. A numerical control method according to claim 6, wherein step (a') comprises performing first and second arithmetic operations each comprising:
  (1) combining said sinusoidal and cosinusoidal values each time said X-axis and Y-axis distributed pulses are received; and
  (2) adding the result of each arithmetic operation to the result of a respective arithmetic operation performed in response to receipt of the immediately preceding respective distributed pulse, and
wherein step (b') comprises:
  (1) producing an output signal, indicative of overflow resulting from said addition based on the result of said first arithmetic operation, as X-axis projective transformation pulses; and
  (2) producing an output signal, indicative of overflow resulting from said addition based on the result of said second arithmetic operation, as Y-axis projective transformation pulses.

8. A numerical control method for positionally controlling the movable element of a machine tool in such a manner that numerically controlled machining is performed along a projected path obtained by projecting a programmed path, lying on a predetermined plane, onto a plane of projection inclined at a predetermined angle with respect to the predetermined plane, said method comprising the steps of:
  (a) entering path data specifying a programmed path on the predetermined plane and projection angle data specifying the predetermined angle;
  (b) subjecting the path data entered in step (a) to a projective transformation in accordance with the entered projection angle data to generate projective transformation data specifying the projected path; and
  (c) performing an interpolation on the basis of the projective transformation data to produce an output signal indicative of the results of the interpolation, and positionally controlling the movable element on the basis of the projective transformation output signal.

9. A numerical control method according to claim 8, wherein step (c) comprises performing a pulse distribution operation as said interpolation to produce distribution pulses as said output signal indicative of the results of said interpolation.

10. A numerical control method according to claim 8, wherein step (a) comprises entering coordinates of starting and end points of straight line segments.

11. A numerical control method according to claim 10, further comprising a step of approximating circular arcs by a multiplicity of minute straight line segments prior to step (a).

12. A numerical control method for positionally controlling a movable element of a machine tool based on path data for a predetermined plane, said method comprising the steps of:
  (a) providing a projective direction angle and projection angle data specifying a projection of the path data onto a projection plane;
  (b) transforming the path data for the predetermined plane into path data for the projection plane in dependence upon the projective direction angle and projection angle data; and
  (c) controlling the movable element in dependence upon the transformed path data.

13. A numerical control method according to claim 12, wherein the transformation is performed in accordance with $$X1-(\cos^2 N + K \sin^2 N)X + \sin N \cos N(1-k)y$$

and $$Y1 - \sin N \cos N(1-k)X + (\sin^2 N + k \cos^2 N)y$$

where X and Y are path data in the predetermined plane, X1 and Y1 are path data in the projection plane. N is the projective direction angle and k is the projection angle data.

14. A numerical control method as recited in claim 13, wherein the projection angle data further includes a projection angle, and wherein k=cos m, where m equals the projection angle.

15. A numerical control method according to claim 13, wherein the projection angle data further includes a projection angle, and wherein k=1/cos m, where m equals the projection angle.

* * * * *

UNITED STATES PATENT AND TRADEMARK OFFICE
CERTIFICATE OF CORRECTION

PATENT NO. : 4,521,721

DATED : June 4, 1985

INVENTOR(S) : KINOSHITA

It is certified that error appears in the above-identified patent and that said Letters Patent is hereby corrected as shown below:

Col. 2, line 17, "x'-Y'" (first occurrence) should be --X'-Y'--.

Col. 7, line 4, after "and" insert --projection--;

line 22, "pules," should be --pulses,--.

Signed and Sealed this

First Day of October 1985

[SEAL]

Attest:

DONALD J. QUIGG

Attesting Officer

Commissioner of Patents and Trademarks—Designate